UNITED STATES PATENT OFFICE.

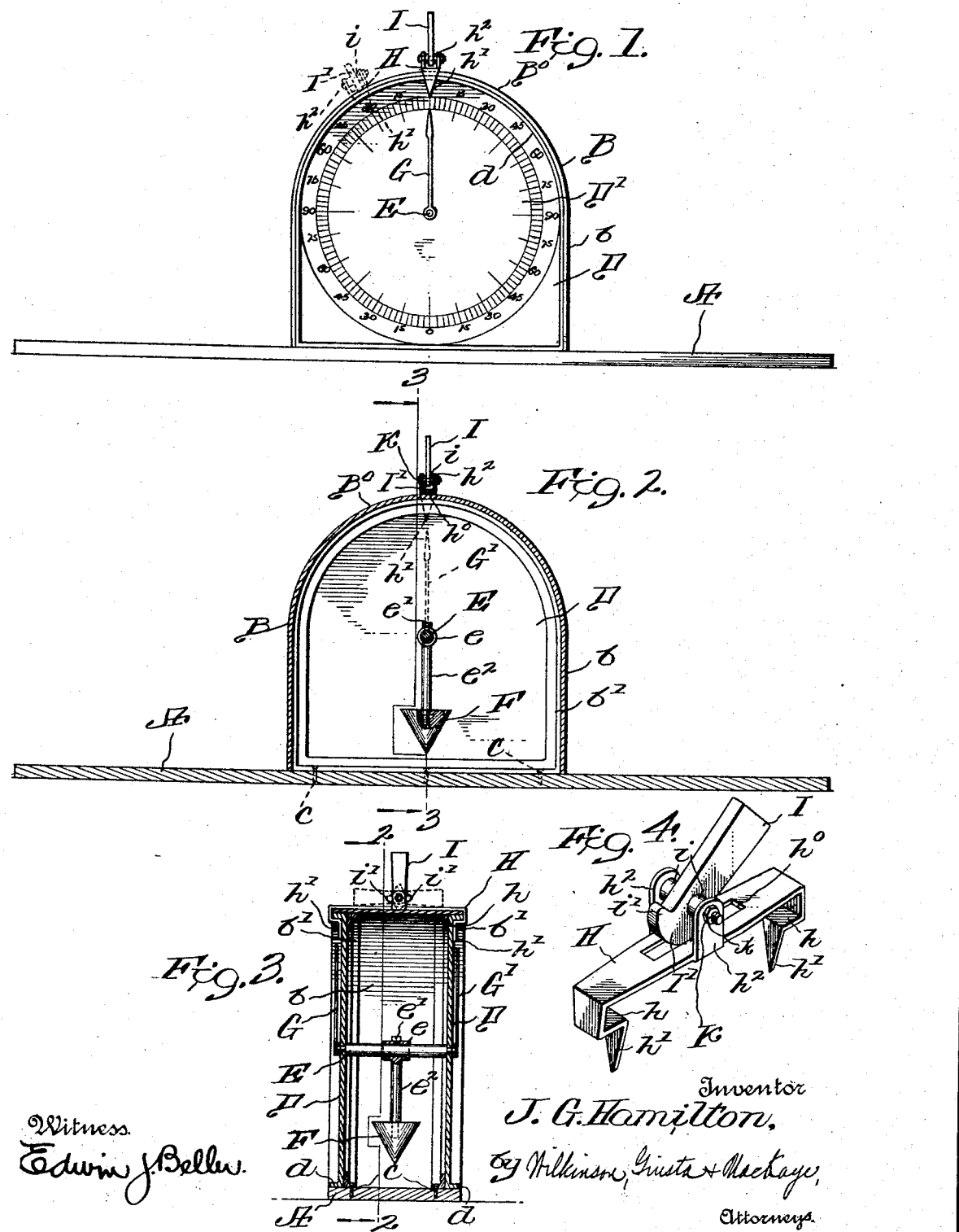
J. G. HAMILTON.
ANGLE INDICATOR AND LEVEL.
APPLICATION FILED JULY 2, 1915.
1,186,394. Patented June 6, 1916.

JOHN G. HAMILTON, OF NEW ORLEANS, LOUISIANA.

ANGLE-INDICATOR AND LEVEL.

1,186,394.  Specification of Letters Patent.  Patented June 6, 1916.

Application filed July 2, 1915. Serial No. 37,747.

*To all whom it may concern:*

Be it known that I, JOHN G. HAMILTON, a citizen of the United States, residing at New Orleans, in the parish of Orleans and State of Louisiana, have invented certain new and useful Improvements in Angle-Indicators and Levels; and I do hereby declare the following to be a full, clear, and exact description of the invention, such as will enable others skilled in the art to which it appertains to make and use the same.

My invention relates to an improved implement for use by carpenters, masons, bricklayers, artisans, or engineers generally to determine when structures are level, or to note the angle of incline of a structure already built, or to indicate the desired angle of incline to which the structure is to be built.

My invention in brief relates to an improved level and angle indicator, and which will be more clearly understood by reference to the accompanying drawings, in which:—

Figure 1 is a side elevation of the complete implement; Fig. 2 shows a central vertical section along the line 2—2 of Fig. 3, and looking in the direction of the arrows; Fig. 3 shows a section along the line 3—3 of Fig. 2, and looking in the direction of the arrows; and Fig. 4 is a detail, showing in perspective the adjustable index carried by the device.

A represents an ordinary rule of any suitable or desirable construction, or material, preferably of metal plate. B represents a casing secured to said rule, constructed of an outer shell $b$ in the form of an arch mounted on a pair of angle frames $b'$, secured to the rule by suitable screws or rivets, such as $c$. Mounted in these frames $b'$, on each side of the casing B, are the face plates D provided with dials D', which are graduated to degrees, or any desired angular graduations, which may be supplemented, if desired, by verniers, not shown, but which are well known in the arts. Across the center of these oppositely-disposed dials is the shaft E, to which the sleeve $e$ is rigidly attached, as by means of a set screw $e'$, and this sleeve $e$ carries an arm $e^2$ to which the plumb-bob F is attached. Opposite the arm $e^2$ of the plumb-bob, the shaft E carries two pointers G and G', which always point 180° from the position of the plumb-bob when the apparatus is in working order.

It will be noted that when the rule A is level, the pointers G and G' will point to the upper zero on the dial, and should this rule A be tiltted to any angle the pointers G and G' will indicate the angle of tilt on their respective dials. I prefer to have two of these dials, one on each side of the device, so that the angle may be read from either side; but a single dial on one side only may be used if desired.

An indicator is carried by the arched top $B^0$ of the casing B, so that a permanent indication may be retained, if desired, of the angle of tilt, and for this purpose I provide a sliding indicator of suitable construction, which slides along the arched top $B^0$ of the casing B, and it may be set at any desired angle. Such an indicator I have shown in Fig. 4, in which H represents a plate of resilient material, bent as at $h$, to engage the flanged edges $d$ of the face plates D, and provided with indicating points $h'$. Such an arrangement may be made to stick at the desired position on the implement by the resiliency of the metal of which the plate H is made; but I provide to have positive locking means, such as the well-known set screw, not shown, or the clamping device shown in Fig. 4 in which $h^2$ represents ears stamped out of the plate H, between which the trunnions $i$ of the clamping lever I are journaled, as on the pin K, held in place by a nut $k$. The lower end I' of this clamping lever I is provided with oppositely-disposed cams $i''$, so that the lever may be operated in either direction, and these cams project, when in engagement, through the slot $h^0$ in the plate H. When this clamping lever I is in the vertical position, as shown in Figs. 1, 2 and 3, the cams $i'$ are disengaged, and the indicator can be easily slid upon the arched portion $B^0$ of the casing B; but when the cam lever I is swung to the horizontal position, in either direction, as shown in dotted lines in Fig. 3, one of the cams $i'$ will swing through the slot $h^0$ in the plate H, and will clamp the plate firmly in position, where it will be held until the cam lever I is released. Thus, for instance, suppose the parts are in the normal or level position shown in Fig. 1, and then the rule is tilted to measure an angle of say 30° to the left of the position shown in Fig. 1, while the rule is in this position slide the indicator to the dotted position shown in Fig. 1 and clamp it and this will keep a permanent record of the angle until the clamping lever is lifted.

It will be seen that I provide a simple implement which is not likely to get out of order, and in which the angle of inclination may be accurately measured from zero, or the level position, up to the angle of 90° which would show the rule A to be in the vertical position, or even at an angle greater than 90°, or of an overhang angle, if desired; while the indicator as shown can be set only to the angles from zero up to 90° in either direction, which would comply with the limits of the ordinary uses of such an implement.

It will be seen that the implement may be used indiscriminately from right to left, or vice versa, and that the position of the pointers G and G′ as determined by the plumb-bob may be read equally well from either side. It will be seen that the cam lever I will form a convenient handle for moving the indicator, and also an index as to whether the indicator is set at the clamped position or not. It will be obvious that various modifications might be made in the herein described apparatus and in the construction, combination and arrangement of parts which could be used without departing from the spirit of my invention.

Having thus described my invention what I claim and desire to secure by Letters Patent of the United States is:—

1. An implement of the character described, comprising a rule, a casing, provided with an arched top, carried by said rule, a dial at one side of said casing, a shaft journaled in said casing concentric with said dial, an arm carried by said shaft, a plumb-bob suspended from said arm, and a pointer fixed on said shaft opposite to said arm and adapted to be moved over said dial by the weight of said plumb-bob and its supporting arm, as the rule is tilted, with an indicator made of resilient material slidably mounted on the arched portion of said casing, and provided with shoulders adapted to engage the edges of the casing, and with a pointing arm projecting beneath one of said shoulders; and a cam lever mounted on said indicator and adapted to engage said casing and to clamp said indicator in the desired position, substantially as described.

2. An implement of the character described, comprising a rule, a casing, provided with an arched top, carried by said rule, dials at each side of said casing, a shaft journaled in said casing concentric with said dials, an arm carried by said shaft, a plumb-bob suspended from said arm, and pointers fixed on said shaft opposite to said arm and adapted to be moved over said dials, respectively, by the weight of said plumb-bob and its supporting arm, as the rule is tilted, with an indicator made of resilient material slidably mounted on the arched portion of said casing, and provided with oppositely-disposed shoulders adapted to engage the edges of the casing, and with pointing arms projecting beneath said shoulders, and a cam lever mounted on said indicator and adapted to engage said casing and to clamp said indicator in the desired position, substantially as described.

In testimony whereof, I affix my signature.

JOHN G. HAMILTON.

Copies of this patent may be obtained for five cents each, by addressing the "Commissioner of Patents, Washington, D. C."